(12) United States Patent
Wright et al.

(10) Patent No.: US 11,560,103 B2
(45) Date of Patent: Jan. 24, 2023

(54) COMPONENT WITH INTEGRATED SENSOR CHIP

(71) Applicant: GM GLOBAL TECHNOLOGY OPERATIONS LLC, Detroit, MI (US)

(72) Inventors: Adam L. Wright, Livonia, MI (US); Nathaniel W. Hart, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 409 days.

(21) Appl. No.: 16/793,491

(22) Filed: Feb. 18, 2020

(65) Prior Publication Data
US 2021/0253040 A1    Aug. 19, 2021

(51) Int. Cl.
*B60R 13/02* (2006.01)
*G01S 7/481* (2006.01)
*B29C 45/14* (2006.01)
*B29C 45/00* (2006.01)
*B29L 31/00* (2006.01)
*B29K 69/00* (2006.01)

(52) U.S. Cl.
CPC .......... *B60R 13/02* (2013.01); *B29C 45/0053* (2013.01); *B29C 45/14* (2013.01); *G01S 7/4813* (2013.01); *B29C 2045/0079* (2013.01); *B29K 2069/00* (2013.01); *B29L 2031/752* (2013.01); *B60R 2013/0287* (2013.01)

(58) Field of Classification Search
CPC ........... B60R 13/02; B60R 2013/0287; B29C 45/0053; B29C 45/14; B29C 2045/0079; B29C 45/14639; B29C 45/1671; G01S 7/4813; G01S 17/931; B29K 2069/00; B29L 2031/752
See application file for complete search history.

(56) References Cited

U.S. PATENT DOCUMENTS

| | | | |
|---|---|---|---|
| 2005/0218694 A1* | 10/2005 | Schoemann | B60J 5/0416 296/146.7 |
| 2009/0174121 A1* | 7/2009 | Hayes | B29C 45/1671 264/261 |
| 2016/0238707 A1* | 8/2016 | Thomas | B60R 11/02 |
| 2020/0083886 A1* | 3/2020 | Vemulapati | H03K 17/955 |
| 2021/0101642 A1* | 4/2021 | Pomish | G01D 11/245 |

\* cited by examiner

*Primary Examiner* — Lori L Lyjak
(74) *Attorney, Agent, or Firm* — Quinn IP Law

(57) ABSTRACT

A vehicle trim assembly includes a first trim component having an interior facing surface and an exterior facing surface, the first trim component including an extended portion, a second trim component including an edge defining a groove configured to engage with the extended portion of the first trim component, and a single chip sensor overmolded with the second trim component such that the single chip sensor is integrated into the second trim component. The single chip sensor is formed with the second trim component in a multi-shot injection molding process.

20 Claims, 2 Drawing Sheets

COMPONENT WITH INTEGRATED SENSOR CHIP

INTRODUCTION

The present disclosure relates generally to a single chip sensor, such as a single chip LiDAR sensor, integrated into a component, such as a plastic vehicle trim component.

The placement of sensors, such as LiDAR sensors behind plastic trim components causes a reduction in range and optical quality of the sensor. The use of optical-grade plastic that allows improved optical quality and range for sensors mounted behind the component increases the manufacturing cost of the component.

SUMMARY

Embodiments according to the present disclosure provide a number of advantages. For example, embodiments according to the present disclosure enable the use of smaller quantities of expensive, optical grade plastics while increasing the effective range and optical quality of the sensor.

In one aspect of the present disclosure, a vehicle trim assembly includes a first trim component having an interior facing surface and an exterior facing surface, the first trim component including an extended portion, a second trim component including an edge defining a groove configured to engage with the extended portion of the first trim component and a single chip sensor overmolded with the second trim component such that the single chip sensor is integrated into the second trim component. The single chip sensor is formed with the second trim component in a multi-shot injection molding process.

In some aspects, the first trim component is a low transmission plastic formed in the multi-shot injection molding process over the second trim component.

In some aspects, the second trim component is a high transmission polycarbonate material.

In some aspects, the vehicle trim assembly further includes a mounting element formed with the first trim component.

In some aspects, the second trim component includes an intermediate layer including an antireflective coating.

In some aspects, the second trim component includes a hard coat including an optical grade infrared transmissive layer and the hard coat is exterior of the intermediate layer.

In some aspects, the single chip sensor includes a sensor lens and the trim assembly includes a heat element to defog the sensor lens of the single chip sensor.

In some aspects, the trim assembly includes a heat conductive material to cool the single chip sensor.

In some aspects, the vehicle trim assembly further includes a heat sink thermally coupled to the single chip sensor.

In some aspects, the vehicle trim assembly further includes a connection member coupled to the single chip sensor and configured to provide power and communication to the single chip sensor.

In another aspect of the present disclosure, a method for manufacturing a trim integrated sensor assembly for a vehicle includes providing a single chip sensor, molding, in an injection molding overmold process, a high transmission trim component around the single chip sensor such that the single chip sensor is integrated into the high transmission trim component, molding, in the injection molding overmold process, a low transmission trim component adjacent to the high transmission trim component, applying an antireflective coating to the high transmission trim component, and applying an infrared transmissive hard coating to the high transmission trim component exterior of the antireflective coating.

In some aspects, the method further includes molding, in the injection molding overmold process, a mounting element adjacent to the low transmission trim component.

In another aspect of the present disclosure, an automotive vehicle includes a vehicle body including a trim integrated sensor assembly. The trim integrated sensor assembly includes a first trim component having an interior facing surface and an exterior facing surface. The first trim component includes an extended portion. A second trim component includes an edge defining a groove configured to engage with the extended portion of the first trim component. A single chip sensor is overmolded with the second trim component. The single chip sensor is formed with the second trim component in a multi-shot injection molding process.

In some aspects, the first trim component is a low transmission plastic formed in the multi-shot injection molding process over the second trim component.

In some aspects, the second trim component is a high transmission polycarbonate material.

In some aspects, the second trim component includes an intermediate layer including an antireflective coating and the second trim component includes a hard coat including an optical grade infrared transmissive layer and the hard coat is exterior of the intermediate layer.

In some aspects, the single chip sensor includes a sensor lens and the trim integrated sensor assembly includes a heat element to defog the sensor lens of the single chip sensor.

In some aspects, the trim assembly includes a heat conductive material to cool the single chip sensor.

In some aspects, the automotive vehicle further includes a heat sink thermally coupled to the single chip sensor.

In some aspects, the automotive vehicle further includes a connection member coupled to the single chip sensor to provide power and communication to the single chip sensor.

BRIEF DESCRIPTION OF THE DRAWINGS

The present disclosure will be described in conjunction with the following figures, wherein like numerals denote like elements.

Figure 1:
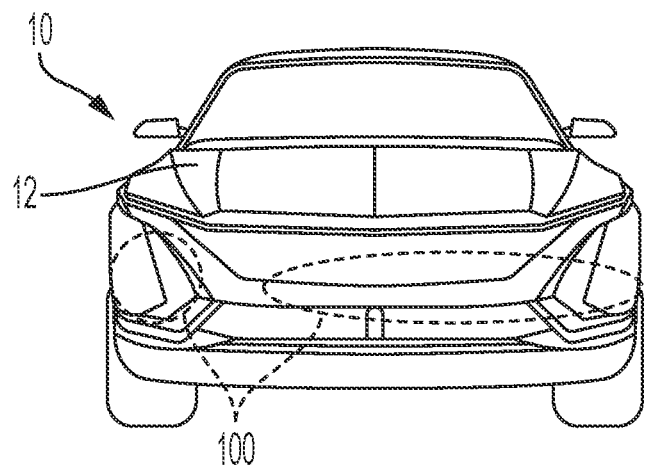
FIG. 1 is a schematic illustration of a vehicle including a sensor-integrated trim component, according to an embodiment of the disclosure.

The foregoing and other features of the present disclosure will become more fully apparent from the foil owing description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Typically, a vehicle sensor, such as a LiDAR sensor, is mounted behind a vehicle trim piece with expensive optical-grade plastic and glass used to cover the lens portion of the sensor. In other embodiments, the sensor is mounted such that the lens opens through a hole in the vehicle trim piece. Both of these approaches increase the cost and manufacturing complexity of the trim component and also sacrifice the range and optical quality of the sensor.

FIG. 1 schematically illustrates a vehicle 10. The vehicle 10 includes a body 12. The body 12 includes a plurality of body structures and components that form an exterior surface of the vehicle 10. In various embodiments, the body 12 includes one or more vehicle trim assemblies 100, such as lighting trim assemblies and grill trim assemblies, for example and without limitation. The vehicle trim assembly 100 includes, in various embodiments, a single chip sensor integrated with the trim assembly to reduce the use of expensive, optical grade materials and improve optical quality of the integrated sensor and trim assembly.

Figure 2:
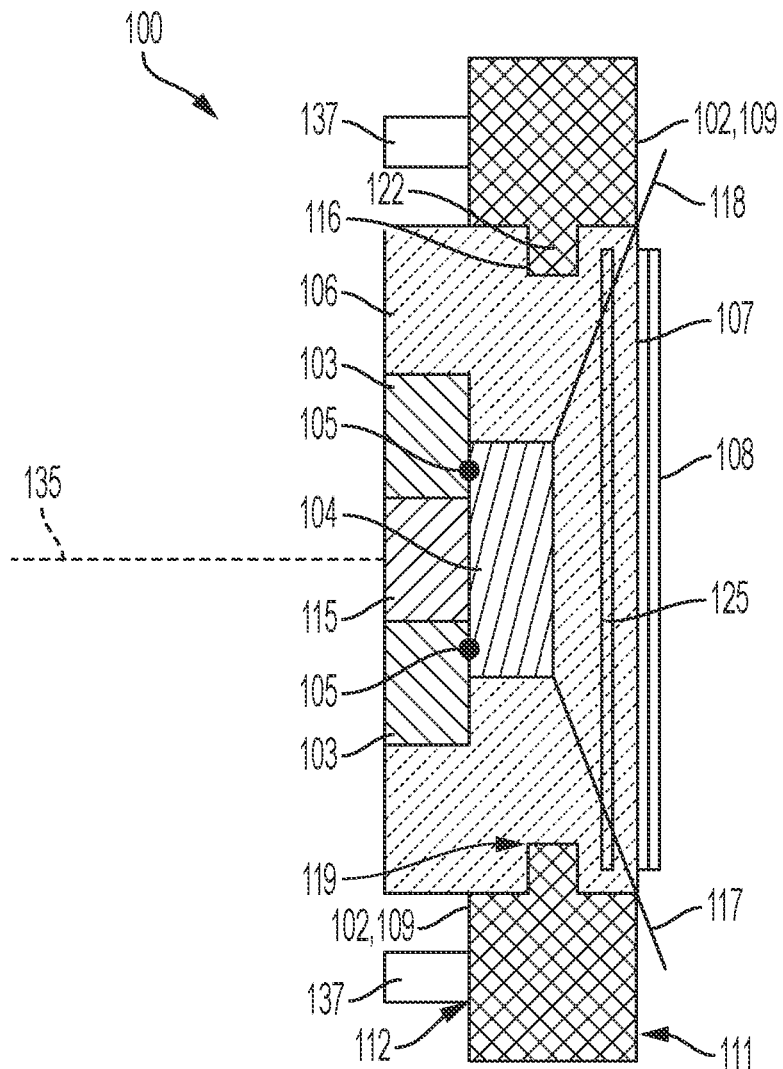
FIG. 2 is a schematic overhead cut-away view of a sensor-integrated trim component, according to an embodiment of the disclosure.

As shown in FIG. 2, the vehicle trim assembly 100 integrates a single chip sensor, such as a chip scale LiDAR sensor, into an injection molded trim component. As is known, the single chip sensor is a chip scale LiDAR sensor that offers significant space, weight, and cost reductions over a separate sensor lens assembly coupled with a sensor module. The single chip sensor is overmolded directly in a high transmission polycarbonate (PC) trim component, resulting in a monolithic vehicle integration of the sensor. The single chip sensor is mounted closer to the exterior or A-surface of the trim component to maintain a wide field of view. Furthermore, the method of manufacture discussed herein is scalable to other vehicle components incorporating LiDAR sensors or other optical sensors, such as vehicle bumpers, rear trim components, lighting assemblies, etc. Integration of the sensor into the trim component further allows for discrete sensor mounting in many locations around the vehicle.

The vehicle trim assembly 100 includes a low transmission trim component 102, a single chip sensor 104, and a high transmission trim component 106. In various embodiments, the single chip sensor 104 is an optical sensor, such as a LiDAR sensor. In various embodiments, the high transmission trim component 106 includes one or more properties such as, for example and without limitation, high UV transparency down to around 300 nm, greater than 92% light transmittance in the visible and near IR wavelength range, low auto-fluorescence, high resistance to solarization, and a low refractive index. In various embodiments, a heat sink 115 is thermally coupled to the single chip sensor 104. The heat sink 115 is, in some embodiments, a thermal electric cooler that provides cooling to the single chip sensor 104 as well as acting as a passthrough for vehicle interfaces such cabling connections, etc. In various embodiments, a printed circuit board 103 is electronically coupled to the single chip sensor 104 via a connection member 105.

The trim assembly 100 includes an exterior facing surface, or A-surface, 111 and an interior facing surface, or B-surface, 112. As shown in FIG. 2, the low transmission trim component 102 is a two-piece construction configured to engage with the high transmission trim component 106 to form a contiguous and aesthetic A-surface 111 of the trim assembly 100. The low transmission trim component 102 members each have an extended portion 122 forming a tongue that fits within a groove 119 defined by an edge 116 in the high transmission trim component 106. The tongue and groove construction of the high transmission trim component 106 and the surrounding trim components 102 minimize the use of the expensive high transmission trim component 106 to the area immediately surrounding the single chip sensor 104. In various embodiments, the tongue and groove construction is formed using a two-shot or multi-shot injection molding process.

The single chip sensor 104 is overmolded directly into the high transmission trim component 106. In various embodiments, the single chip sensor 104 is incorporated into a multi-shot injection molding process that forms the high transmission trim component 106. In various embodiments, robotic assistance is used to precisely control the placement of the single chip sensor 104 within the molded high transmission trim component 106.

Once the single chip sensor 104 is integrally molded with the high transmission trim component 106, lower cost trim components, such as the low transmission trim component 102, can be joined to the high transmission trim component 106. This interchangeable construction allows the single chip sensor 104 to be placed in various locations around the vehicle, such as within a vehicle light assembly, a bumper assembly, a side panel assembly, etc., for example and without limitation.

In various embodiments, an intermediate layer 107 is incorporated into the trim assembly 100 between an exterior surface of the high transmission trim component 106 and an exterior hard coat 108. The intermediate layer 107 is, in various embodiments, an antireflective coating optimized for use with LiDAR sensors, such as the single chip sensor 104. In various embodiments, optical antireflective coatings reduce the reflectivity of the windshield thereby reducing veiling glare. The hard coat 108 is incorporated into the external layer of the trim assembly 100. In various embodiments, the hard coat 108 is an optical grade infrared transmissive layer. The overmolded integration of the single chip sensor 104 within the trim assembly 100 and placement of the single chip sensor 104 closer to the A-surface 111 of trim assembly 100 reduces the amount of the hard coat 108 needed to cover and protect the optical transmission surface of the trim assembly 100.

In various embodiments, the placement of the single chip sensor 104 closer to the A-surface of the trim assembly 100 enables a wider field of view, as shown by the field of view limits 117, 118, while also minimizing the size of the viewing window through the high transmission trim component 106. This placement enables a less intrusive integration of the single chip sensor 104 to maintain an aesthetic appearance of the vehicle. Furthermore, the integration of the single chip sensor 104 within the high transmission trim component 106 reduces the amount of material traveled through by an optical transmission to/from the single chip sensor 104. In various embodiments, one or more heating elements, such as a heat element 125, is incorporated into the trim assembly 100. The heat element 125 defogs and/or defrosts the integrated single chip sensor 104.

In various embodiments, cabling and connection elements, such as connection members 135, are coupled to the single chip sensor 104 to provide power to the components and/or communication capability. In various embodiments, the connection members 135 connect the components to at least one controller of the vehicle via a wireless or wired connection.

With continued reference to FIG. 2, in various embodiments, the trim assembly 100 includes one or more mounting elements 137. In various embodiments, the mounting elements 137 are formed in the injection molding process with the low transmission trim component 102. The mounting elements 137 are configured to help mount and locate the trim assembly 100 within the overall body structure of the vehicle 10. For example, the mounting elements 137 are used to place and couple the trim assembly 100 to adjacent trim assemblies of the vehicle 10.

Figure 3:
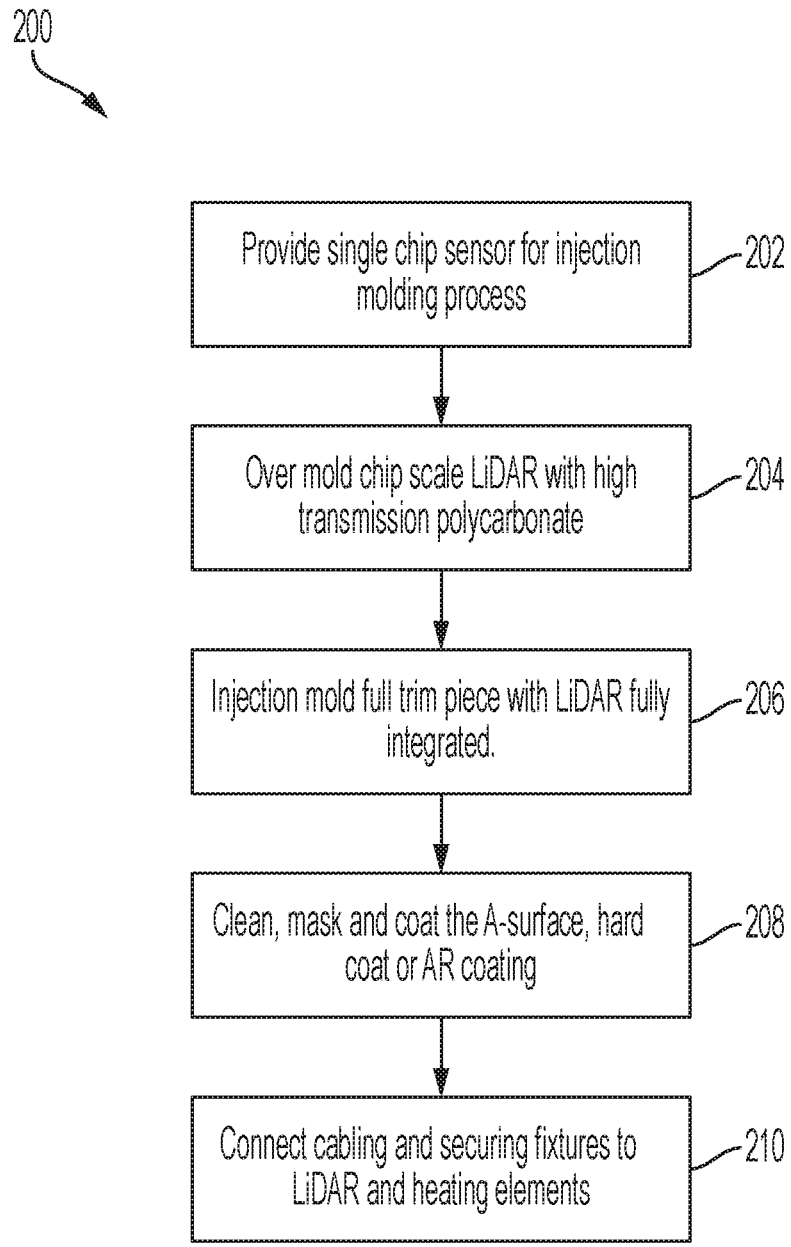
FIG. 3 is a flow diagram of a method for manufacturing a sensor-integrated trim component, according to an embodiment of the disclosure.

FIG. 3 illustrates a method 200 to manufacture an integrated sensor and trim assembly. The method 200 can be utilized in connection with the vehicle trim assembly 100 discussed herein. The order of operation of the method 200 is not limited to the sequential execution as illustrated in FIG. 3, but may be performed in one or more varying orders, or steps may be performed simultaneously, as applicable in accordance with the present disclosure.

Beginning at 202, the single chip sensor 104 is provided and specifically placed for the injection molding process. The specific placement tightly controls the position of the single chip sensor 104 within the mold for the duration of the molding process. Next, at 204, a first shot of a multi-shot injection molding process is performed. In the first shot, the single chip sensor 104 is overmolded with the high transmission trim component 106. In various embodiment, the high transmission trim component 106 is formed from a high transmission polycarbonate material configured for LiDAR optical transmissions. Robotic assistance may also be used to exactly place the single chip sensor 104 within the high transmission trim component 106. Additionally, in some embodiments, an initial surface finish is applied to the exterior surface of the high transmission trim component 106.

The method continues with 206, as the low transmission trim component 102 is overmolded around the sensor-integrated high transmission trim component 106. The low transmission trim component 102 is manufactured from less expensive materials than those used to form the high transmission trim component 106 and, in various embodiments, also includes heat conductive materials 109 to act as a heat sink for the single chip sensor 104. Mounting and locating elements, such as the mounting or locating elements 137, are also molded into the low transmission trim component 102.

Next, at 208, an exterior surface of the high transmission trim component 106 is cleaned and polished. In various embodiments, a masking material and coating material, such as the antireflective coating 107 and the hard coat 108 are applied to the sensor-integrated trim assembly 100 to protect the lens surface and permit clear transmission and receipt of optical waves.

Finally, at 210, cabling and other electrical connection elements, such as the connection members 135 are secured to the single chip sensor 104 and/or the heating elements, such as the heat element 125.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be Construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle trim assembly, comprising:
   a first trim component having an interior facing surface and an exterior facing surface, the first trim component including an extended portion;
   a second trim component including an edge defining a groove configured to engage with the extended portion of the first trim component; and
   a single chip sensor overmolded with the second trim component such that the single chip sensor is integrated into the second trim component; wherein the single chip sensor is formed with the second trim component in a multi-shot injection molding process.

2. The vehicle trim assembly of claim 1, wherein the first trim component is a low transmission plastic formed in the multi-shot injection molding process over the second trim component.

3. The vehicle trim assembly of claim 1, wherein the second trim component is a high transmission polycarbonate material.

4. The vehicle trim assembly of claim 1 further comprising a mounting element formed with the first trim component.

5. The vehicle trim assembly of claim 1, wherein the second trim component includes an intermediate layer comprising an antireflective coating.

6. The vehicle trim assembly of claim 5, wherein the second trim component includes a hard coat comprising an optical grade infrared transmissive layer and the hard coat is exterior of the intermediate layer.

7. The vehicle trim assembly of claim 1, further comprising a heat element to defog the single chip sensor.

8. The vehicle trim assembly of claim 1, wherein the first trim component includes a heat conductive material to cool the single chip sensor.

9. The vehicle trim assembly of claim 1 further comprising a heat sink thermally coupled to the single chip sensor.

10. The vehicle trim assembly of claim 1 further comprising a connection member coupled to the single chip sensor and configured to provide power and communication to the single chip sensor.

11. An automotive vehicle comprising
    a vehicle body including a trim integrated sensor assembly, the trim integrated sensor assembly including a first trim component having an interior facing surface and an exterior facing surface, the first trim component including an extended portion;
    a second trim component including an edge defining a groove configured to engage with the extended portion of the first trim component; and
    a single chip sensor overmolded with the second trim component, wherein the single chip sensor is formed with the second trim component in a multi-shot injection molding process.

12. The automotive vehicle of claim 11, wherein the first trim component is a low transmission plastic formed in the multi-shot injection molding process over the second trim component.

13. The automotive vehicle of claim 11, wherein the second trim component is a high transmission polycarbonate material.

14. The automotive vehicle of claim 11, wherein the second trim component includes an intermediate layer comprising an antireflective coating and the second trim component includes a hard coat comprising an optical grade infrared transmissive layer and the hard coat is exterior of the intermediate layer.

15. The automotive vehicle of claim 11, wherein the trim integrated sensor assembly includes a heat element to defog the single chip sensor.

16. The automotive vehicle of claim 11, wherein the first trim component includes a heat conductive material to cool the single chip sensor.

17. The automotive vehicle of claim 11 further comprising a heat sink thermally coupled to the single chip sensor.

18. The automotive vehicle of claim 11 further comprising a connection member coupled to the single chip sensor to provide power and communication to the single chip sensor.

19. The automotive vehicle of claim 11 further comprising a mounting element formed with the first trim component.

20. The automotive vehicle of claim 11, wherein the second trim component includes an intermediate layer comprising an antireflective coating.

* * * * *